United States Patent Office 3,115,518
Patented Dec. 24, 1963

3,115,518
PRODUCTION OF CYCLOHEXYLIDENEAMI-
NOOXYACETIC ACID, ITS ESTERS, AND ITS
SALTS
Jonas Kamlet, deceased, late of New York, N.Y., by Edna
Yadven Kamlet, executrix, New York, N.Y., assignor
to E. I. du Pont de Nemours and Company
No Drawing. Filed Feb. 9, 1962, Ser. No. 172,351
6 Claims. (Cl. 260—468)

This invention relates to a novel class of cyclohexylidene substituted acetic acids and to their preparation.

According to the present invention, a novel class of compounds has been discovered that has outstanding usefulness as insecticides and feed supplements. This class of compounds is particularly advantageous in insecticidal activity without corresponding toxicity to animals. The compounds of this invention are of use as intermediates for the synthesis of aminooxyacetic acid and its salts.

The class of compounds within the present invention can be represented by the following formula:

(1) 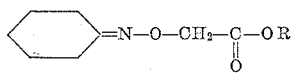

wherein R is hydrogen, alkyl of less than 5 carbon atoms, alkali metal or alkaline earth metal.

Particularly preferred are the sodium, potassium, magnesium and calcium salts of these compounds.

The novel compounds of this invention are generally white solid crystalline powders. They are generally soluble in acetone or water.

Illustrative of the compounds of the above formula can be mentioned:

Cyclohexylideneaminooxyacetic acid
Cyclohexylideneaminooxyacetic acid, sodium salt
Cyclohexylideneaminooxyacetic acid, potassium salt
Cyclohexylideneaminooxyacetic acid, barium salt
Cyclohexylideneaminooxyacetic acid, calcium salt
Cyclohexylideneaminooxyacetic acid, methyl ester
Cyclohexylideneaminooxyacetic acid, ethyl ester
Cyclohexylideneaminooxyacetic acid, n-propyl ester
Cyclohexylideneaminooxyacetic acid, isopropyl ester
Cyclohexylideneaminooxyacetic acid, n-butyl ester
Cyclohexylideneaminooxyacetic acid, tert-butyl ester
Cyclohexylideneaminooxyacetic acid, isobutyl ester Outstanding results as feed supplements are obtained using the following compounds:

Cyclohexylideneaminooxyacetic acid
Cyclohexylideneaminooxyacetic acid, sodium salt
Cyclohexylideneaminooxyacetic acid, potassium salt
Cyclohexylideneaminooxyacetic acid, calcium salt The above class of compounds can be prepared by reacting cyclohexanone oxime with a suitable haloacetic acid or haloacetic acid derivative, in the presence of a base. The reaction will take place according to the following equation:

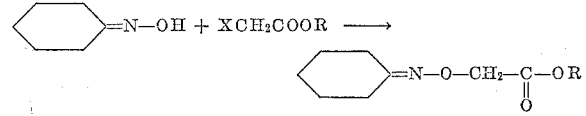

wherein

X is chlorine or bromine, and
R has the same meaning as above.

It will be recognized that cyclohexanone oxime can be in the form of the sodium, potassium or other salt at the precise time the reaction with the acetic acid compound takes place. It will also be understood that the base can be any alkali or alkaline earth metal hydroxide including sodium hydroxide, potassium hydroxide, calcium hydroxide and the like.

The reaction will preferably take place in an aqueous system. Although not necessary, there can be used in place of or preferably with the water a water-miscible organic solvent such as methanol, ethanol, isopropanol, dioxane, dimethylformamide, and the like. This water system or other solvent medium will normally be used in an amount sufficient to have the reactants in a homogenous solution. An excess of non-aqueous solvent can, of course, be used but will generally be avoided because of inconvenience and expense. It will be understood that, depending upon the reactant, some water may be formed during the reaction and this water of reaction can also be used, in part, as the solvent.

The order of addition of the reactants is not critical. For convenience, it will generally be preferred to dissolve the oxime in a basic solution, followed by the addition of the acetic acid derivative. The reaction can be accelerated by gentle heating, if desired. Temperatures on the order of from about 40° C. to the boiling point of the system are preferred. Particularly advantageous results are obtained when the temperature is within the range of from 90° to 105° C.

The reactants will generally be used in equimolar amounts with some excess acid, about 1 to 5 molar equivalents of acid being advantageous. The amount of base used will generally be about 1 to 5 molar equivalents, based on cyclohexanone oxime.

Carrying out the above reaction results in the formation of the desired product. The product can be recovered simply by cooling the reaction mass, and, in the case of salt formation the salts can be recovered simply by concentration and removal of the solvent. In the case of ester formation, the product can be obtained by suitable concentration, if desired, followed by extraction of the product with an immiscible organic solvent such as ether or benzene followed by recovery of the product from the solvent by conventional evaporation methods.

It will be understood, of course, that the above process can start with the suitable haloacetic acid itself which will be converted to the corresponding cyclohexylideneaminooxyacetic acid, and this latter compound converted readily to the salt or ester by simple reaction with a salt forming compound such as sodium hydroxide or esterification with a selected material such as methanol.

The above process provides a short, rapid and highly efficient method for producing the compounds of Formula 1 in high yields and in excellent purity. The process can be carried out in conventional equipment and is readily operable on a batch or continuous basis.

This invention will be better understood by the following illustrative examples, wherein the parts indicated are parts by weight.

*Example 1*

Forty parts by weight of sodium hydroxide is dissolved in 250 parts of water. To this aqueous solution is added 113 parts of cyclohexanone oxime with gentle stirring. Ninety-four and five-tenths parts of chloroacetic acid is added and the reaction mass is heated under reflux conditions for a period of about one hour. After cooling and extracting with ether to remove neutral material, the solution containing cyclohexylideneaminooxysodium acetate is acidified with hydrochloric acid to get a tan precipitate. The product is purified by dissolving in benzene, treating with "Darco" 60 and filtering. The filtrate, on dilution with petroleum ether and cooling, affords a mass of white crystals of cyclohexylideneaminooxyacetic acid.

This cyclohexylideneaminooxyacetic acid when sprayed on aphids and mites in a 2% by weight solution in aqueous acetone, provides effective control of these insects.

*Example 2*

One hundred and thirteen parts of cyclohexanone oxime is stirred into a solution of 57 parts of potassium hydroxide in 125 parts of water and 125 parts of methanol. While stirring, 164 parts of ethyl bromoacetate is added all at once. The reaction mass is heated at reflux for two hours then concentrated to dryness. The residue is extracted with hot benzene, concentration of the extract affording cyclohexylideneaminooxyethyl acetate.

*Example 3*

The product from Example 1 is dissolved in an equivalent amount of 1 N-sodium hydroxide. Concentration to dryness affords substantially pure cyclohexylideneaminooxyacetic acid, sodium salt.

*Example 4*

The product from Example 1 is stirred with an equivalent amount of 0.8 N-calcium hydroxide. Concentration to dryness gives cyclohexylideneaminooxyacetic acid, calcium salt.

*Example 5*

One hundred and thirteen parts of cyclohexanone oxime and 138 parts of isopropylchloroacetate are stirred into a solution of 320 parts of barium hydroxide octahydrate in 7,000 parts of water. The reaction mass is held at 75° C. for eight hours, then cooled and extracted with ether. The ether extract is washed with 2 N-aqueous sodium hydroxide, then with water, dried over magnesium sulfate and concentrated to yield cyclohexylideneaminooxyacetic acid, isopropyl ester.

The invention claimed is:
1. A compound of the formula:

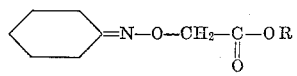

wherein R is selected from the group consisting of hydrogen, alkyl of less than 5 carbon atoms, alkali metal and alkaline earth metal.

2. Cyclohexylideneaminooxyacetic acid.
3. Cyclohexylideneaminooxyacetic acid, sodium salt.
4. Cyclohexylideneaminooxyacetic acid, calcium salt.
5. Cyclohexylideneaminooxyacetic acid, ethyl ester.
6. The process comprising reacting cyclohexanone oxime with a compound of the formula:

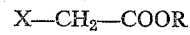

wherein
X is selected from the group consisting of chlorine and bromine, and
R is selected from the group consisting of hydrogen, alkyl of less than 5 carbon atoms, alkali metal and alkaline earth metal, in the presence of a compound selected from the group consisting of alkali metal hydroxide and alkaline earth metal hydroxide at a temperature in the range from about 40° C. to 110° C. for a period of from about 10 minutes to about eight hours and recovering the resulting product having the formula:

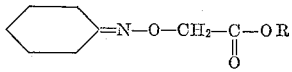

wherein R has the same meaning as above.

No references cited.